Jan. 27, 1970  L. C. JOHNSON  3,491,452
TAP GAGE FOR LOW CUTTING EDGE AND DIAMETER
Filed Nov. 28, 1967  2 Sheets-Sheet 1

INVENTOR.
LOWELL C. JOHNSON
BY
John M. Montstream
ATTORNEY

Jan. 27, 1970  L. C. JOHNSON  3,491,452
TAP GAGE FOR LOW CUTTING EDGE AND DIAMETER
Filed Nov. 28, 1967  2 Sheets-Sheet 2

INVENTOR.
LOWELL C. JOHNSON
BY
John M. Montstream
ATTORNEY

United States Patent Office 3,491,452
Patented Jan. 27, 1970

3,491,452
TAP GAGE FOR LOW CUTTING EDGE AND
DIAMETER
Lowell C. Johnson, West Granby, Conn., assignor to
The Johnson Gage Company, Bloomfield, Conn., a
corporation of Connecticut
Filed Nov. 28, 1967, Ser. No. 686,138
Int. Cl. G01b 5/20
U.S. Cl. 33—201                                    7 Claims

ABSTRACT OF THE DISCLOSURE

The invention is directed to a gage for testing whether or not a tap has a low cutting edge. The gage includes a fixed gaging element with a drop off shoulder providing a gaging edge for contacting the thread of the tap adjacent to the cutting face of a flute. The fixed gaging element may be a roll or segment and either may have a plurality of gaging edges. The tap is supported in gaging position by cooperating or gaging means which may be a segmental element or circumferentially spaced roll elements. The cooperating means moves towards and away from the fixed gaging element for insertion and removal of a tap. The tap is turned between the elements so that the gaging edge follows the thread profile of the tap adjacent to the cutting face of the flute. An indicator is responsive to the movement of the movable element or elements and reveals a low cutting edge. Preferably, the gage also tests the accuracy of the diameter of the tap thread.

---

The invention relates to a gage for testing whether or not a tap has a low cutting edge. One of the main problems in connection with whether or not a tap is properly manufactured, is a low cutting edge. A low cutting edge is one in which the thread of the tap at the cutting edge of the flute which is to do the thread cutting, the thread form drops off to a small radius. The edge is in effect a blunt cutting edge. This low cutting edge may arise from one or more causes in the manufacture of a tap. The gage herein provides a simple and effective test to determine whether or not a tap has low cutting edges. The gage preferably is constructed so that it also tests, at the same time, the accuracy of the diameter and preferably the pitch diameter, of the thread of the tap.

It is an object of the invention to construct a simple gage which tests as to whether or not the cutting edge of the tap is full at this edge or drops off and has a low cutting edge.

Another object of the invention is to construct a tap gage capable of making the test set forth in the preceding paragraph and which gage also tests for the accuracy of the diameter of the thread of the tap particularly at the cutting edge.

Another object is to construct these gages with a fixed gaging element and the cooperating elements of the roll type, or a roll and cooperating element of the segment type or with both the fixed gaging element and the cooperating element of the segment type.

Other objects of the invention will be more apparent from the following description when taken in connection with the accompanying drawings illustrating preferred embodiments thereof in which.

Figure 1:
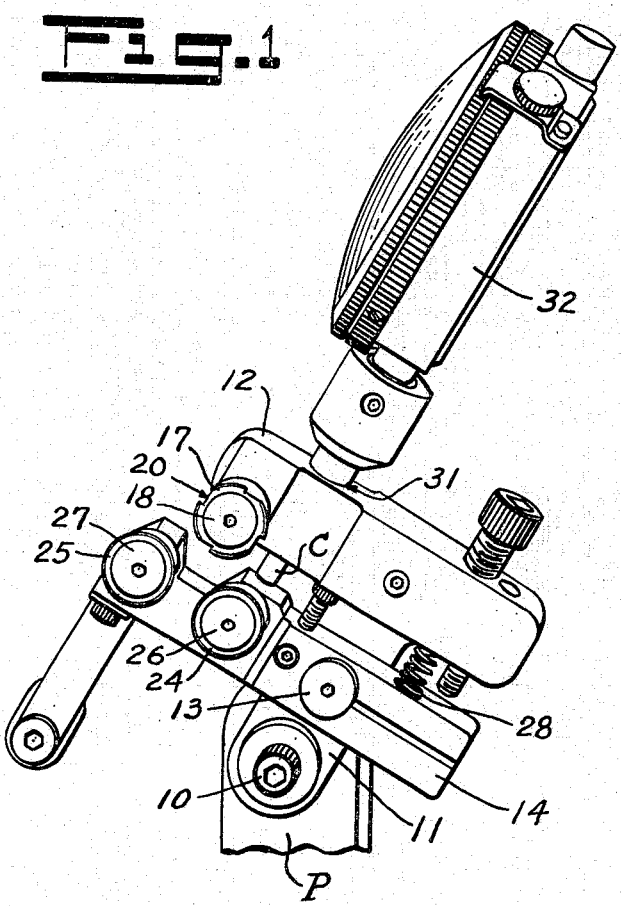
FIGURE 1 is a perspective side view of a gage of the tri-roll type.

The tap gage may have a base of suitable form that shown having a pedestal P carrying a clamping bolt 10 which receives the frame 11 of the gage. The gage may be tilted on the base to suit the convenience of the inspector. The gage frame carries a fixed arm 12 and mounting means for a movable arm so that the movable arm moves towards and away from the fixed arm. Preferably, the mounting means is a pivot 13 and a movable arm 14 pivots thereon. Such pivotal mounting means is well known.

A gaging element is mounted on the fixed arm in any suitable manner. The gaging element illustrated in FIG. 1 is a gaging roll modified to serve as a fixed gaging element 17 and is mounted on a roll stud 18. In a conventional gage. The gaging roll is mounted to turn on its stud, however, the fixed gaging element for the tap gage is clamped in position by the stud means or held against turning in any suitable manner so that it is retained in fixed position for gaging. It may be adjusted to a different position as will appear.

The fixed gaging element carries a gaging edge 19 (FIG. 5), which may be in the form of a cone or V, that particularly shown being a V. It is convenient to use a gaging roll of usual form with the gaging ridge 22 cut away or recessed 20 at least at one point on the circumference in order to provide a shoulder 21 extending radially from the gaging center B although it could be under-cut a little if desired. The fixed gaging element particularly illustrated has four recesses around its periphery thereby providing four separate radial shoulders and gaging edges so that when one gaging edge wears another gaging edge may be brought into gaging position by unclamping the element and turning it on its stud. Each recess extends axially as well as radially and has the peak of the V removed so that the gaging edge 19 shown comprises two axially spaced contacting edges for engaging at the pitch of the tap thread.

The gage also provides cooperating supporting means on the movable arm so that the tap may be turned thereon. The supporting means may be a pair of circumferentially spaced rolls 24 and 25 mounted on the movable arm or movement towards and away from the fixed gaging element. Preferably, the supporting means is also gaging means and when it constitutes spaced rolls they are cooperating gaging elements. The movable arm and its supporting elements or rolls are propelled towards the fixed arm and its fixed gaging element by a spring 28. The supporting or gaging rolls are mounted for rotation on the movable arm on suitable studs 26 and 27 respectively which are secured to the arm. The studs may be eccentric for adjustment of the position of the rolls. The supporting or gaging rolls are circumferentially spaced in accordance with the number of flutes which would be at or about 120 degrees apart from gaging center B with respect to the fixed gaging element when in gaging position engaging a thread on a three or a six fluted tap. If the tap carries more than three flutes, the cooperating rolls are circumferentially located so as to engage the thread which is generally opposite from the cutting edge of the tap engaged by the fixed gaging element and also engages the thread at or adjacent to the cutting edge if it is a "con-eccentric" tap in order to support the tap. The cooperating rolls particularly illustrated when serving as gaging rolls engage the thread of the tap generally oppositely from the fixed gaging element and are properly located axially with respect to the fixed gaging element in accordance with the helix of the thread on the tap. When the rolls serve solely as supporting elements their location is not as particular so long as they support the tap when gaging for low cutting edge.

Means are provided to indicate the position of the cooperating rolls 24, 25 or the position of the pivoted arm when a tap is within the gage and a convenient way of accomplishing this is by providing a socket or hole 31 in one arm, preferably, the fixed arm, and mounting a dial indicator 32 in this socket. The contactor C of the indicator is shown as engaging the other or movable arm of the gage to indicate the position of this arm hence also the position of the cooperating elements.

In setting up the gage, a master thread plug is inserted in the gage and the dial of the indicator is then set at zero for the needle position. Usually the indicator is positioned in the socket when a master plug is in the gage so that the pointer points upwardly. Any deviation in the diameter of the tap will be revealed by the position of the needle with respect to zero or zero reading provided by the master plug. This tests as to the accuracy of the diameter of the gage and consequently, the thread ridges on the gaging elements are preferably of the pitch diameter form, that is they have line or small flank contact, such as .09H (height), with the flanks of the thread and engage the flanks at or about at the pitch diameter.

Figure 6:
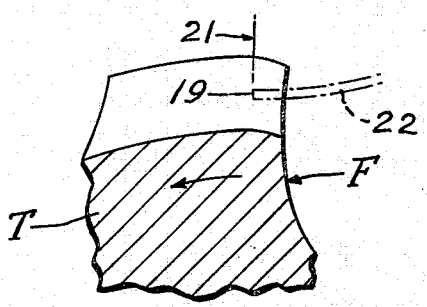
FIG. 6 is an enlarged view in section of the cutting edge of a tap having a low cutting edge and the fixed gage element engaging the same spaced a short distance from the cutting edge.

In using the gage after it has been set up, a tap is inserted within the gage with the tap positioned so that the cutting edge of face F of the flute of the tap is adjacent to the fixed gaging element. FIG. 6, and a reading taken on the indicator. This reading tells whether or not the pitch diameter of the thread on the tap is within the allowable tolerance. Other readings may be taken axially to test for taper. This reading should be taken relatively close to, but spaced from, the cutting edge or face of the flute for two reasons, first because some taps are "con-eccentric" and have a full diameter adjacent to the cutting edge of about 7 thousandths of an inch extent from the cutting edge after which the thread ridge tapers off to a lesser diameter to the next flute and, secondly, to avoid a low cutting edge from a affecting the reading if the tap has one.

After the diameter test or reading has been made, the tap is turned slowly (FIG. 6) between the fixed gaging element and the cooperating supporting means or gaging elements with the cutting face of the flute moving towards the drop off shoulder 21 of the fixed gaging element and the indicator is watched. If the indicator pointer gradually moves away from its initial position, or the position of the pointer when the diameter test was made, before the gaging element or shoulder 21 drops off at the flute face or edge, it is known that the tap has a low cutting edge as illustrated in FIG. 6. When the radial shoulder of the fixed gaging element passes the edge of the flute, the pointer on the indicator drops off sharply so that it is the gradual movement of the pointer before the drop off occurs which determines that there is a low cutting edge and the amount of movement of the pointer on the dial from its maximum value to the point of sudden drop off provides a measure as to the amount of low cutting edge of the tap.

If the rolls 24 and 25, are of relatively large diameter, they can be circumferentially spaced 120 degrees apart from the fixed gaging element because their arc will still engage and support the tap thread up until at least the drop off of the fixed gaging element. If, the cooperating rolls are relatively small however, and it is preferable for both large and small rolls, the angular position between the fixed gaging element 17 and roll 25 should be about 130 degrees and between rolls 25 and 24 should be about 120 degrees. So located the rolls 25 and 24 will be spaced about 10 degrees from its flute edge and will still have full thread contact even after the tap has been turned to bring the cutting face F of the flute to the drop off shoulder 21 of the fixed gaging element. It assures too that a low cutting edge at the supporting rolls will not have any effect.

Figure 2:
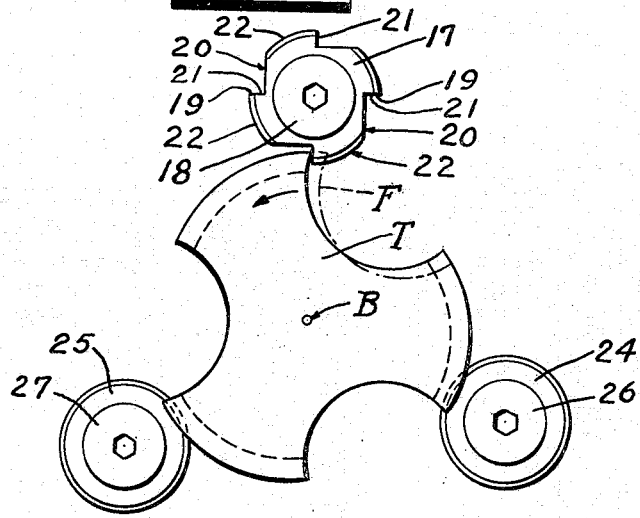
FIGURE 2 is an enlarged side view of the gaging elements of a roll type tap gage.
Figure 3:
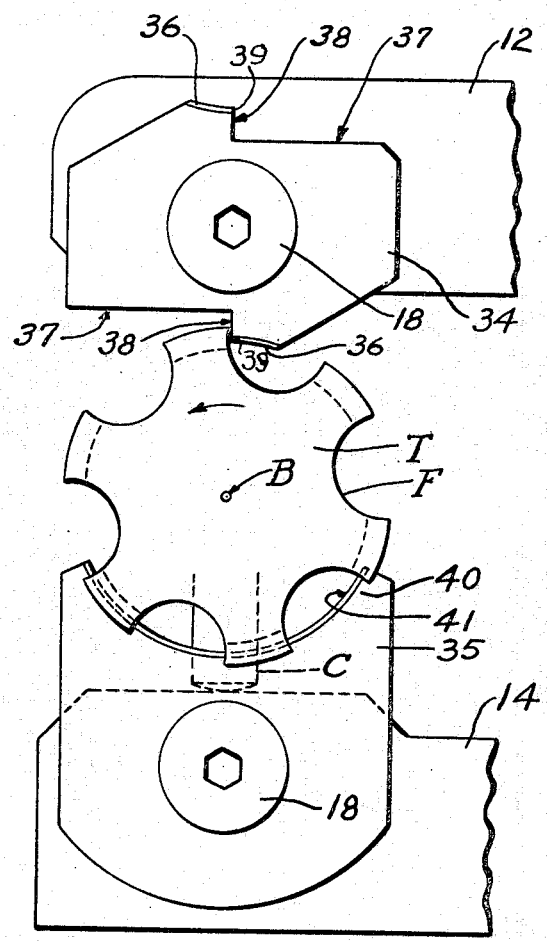
FIGURE 3 is an enlarged side view of the gaging elements of the segmental type.

FIGURE 3 illustrates a gage using a segmental type of fixed gaging element 34 and cooperating element 35 for determining whether or not a tap has a low cutting edge. Providing the cooperating element with a gaging ridge, then the gage will also test the accuracy of the diameter of the tap. A gage with a segmental supporting or gaging element is better suited for taps having helical flutes or having a multiplicity of flutes or both. The fixed gaging element has a portion of the concave thread engaging ridge 36 cut away or recessed 37 to provide a radial drop-off shoulder 38 and a gaging edge 39. As a practical matter the fixed element is made from a thread gaging element so that the ridge thereon is helical although it need not be if sufficient backward clearance from the gaging edge is provided. The cooperating supporting segment supports the tap when the test is being made. The fixed segment is mounted on the stud 18 on the fixed arm 12 of the gage and is clamped or otherwise secured in fixed position. This tap gage differs with segmental elements from a gage for testing the accuracy of screw threads in that this segment in the latter gage usually pivots on its stud for insertion and removal of a screw or bolt from the gage. The supporting or gaging segmental element is also mounted on its stud 18 carried by the movable arm 14 and conveniently it is pivotal on its stud for easy insertion and removal of a tap therefrom. The supporting element has a concave supporting surface 40 which permits turning of the tap. Preferably, it serves also as a gaging element in which event the concave surface is a helical gaging ridge 40 of the cone type and preferably of a pitch diameter form. The segment could be fixed or non pivotal, however, it is more practical for this element to adjust itself to the tap rather than trying to set it properly in fixed position. The fixed segment may have a plurality of concave gaging ridges 36, two being shown, spaced circumferentially from each other, in the same manner that the fixed gaging roll of FIG. 2 has four recesses. The gage of FIG. 3 is used in the same manner as described in connection with the gage of FIG. 1 except that the cooperating segment pivots hence the manner of use need not be repeated.

Figure 4:
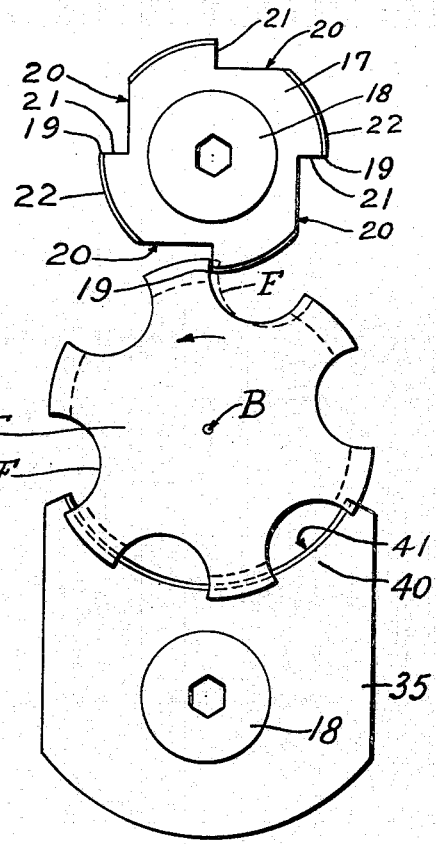
FIGURE 4 is an enlarged side view of the gaging elements of a tap gage of the roll and segment type.

FIGURE 4 shows another form or combination of the tap gage in which the cooperating or supporting element 35 is a segment the same as that of FIG. 3 and the fixed gaging element 17 is of the roll type, the same as shown in FIG. 1. This roll is fixed in position, as in the gage of FIG. 1, and the supporting element 35 is pivotally mounted on its stud 18 as described for FIG. 3. If the gage is to be used also for gaging the diameter of the tap, the concave surface of the supporting segment will be provided with a helical thread gaging ridge 41 preferably of the pitch diameter form. This gage also is used in the same manner that the gage of FIGS. 1 and 3 are used as described above.

The form of the gaging ridge in the three different types of gages illustrated may be full gaging V form, such as ⅞H (height) or less. Preferably, it is of a form for gaging pitch diameter, that is the flank contact would be line contact or preferably .09H contact which provides a little surface contact to reduce wear. The gages described therefore, may test the tap solely for low cutting edge but preferably also gages the tap for the thread diameter and particularly pitch diameter. The sectional form of the gaging surfaces or ridge is the same for both the roll type of gaging element as well as for the segmental type. The pitch diameter profile of the gaging edge shown for a roll type and a segment type is as shown in FIG. 5.

FIGURE 6 is a partial sectional view somewhat enlarged, illustrating a low cutting edge at the cutting face of the flute of the tap which forms the cutting edge. The dot-dash lines illustrate the initial location of the drop-off shoulder of the fixed gaging element whether of the roll or segment type. As the tap is turned in the direction of the arrow, the gaging edge at the drop off shoulder of the fixed gaging element approaches the cutting face and responds, or moves downwardly with any low cutting edge on the thread of the tap. The gradual movement of the indicator pointer reveals the low cutting edge and its amount. A row of cutting thread teeth on the tap may be tested for low cutting edge in one or more positions axially. The cutting teeth of other rows may be similarly tested. The number of tests which are made will be determined by the desires of the tap manufacturer or user.

Figure 5:
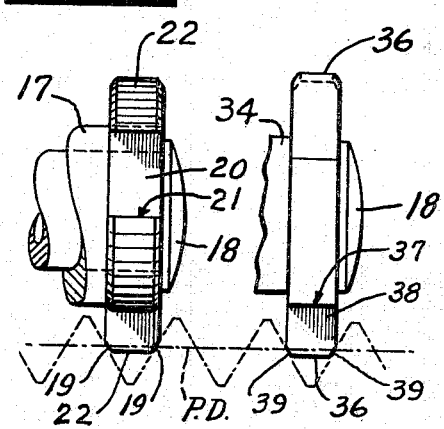
FIGURE 5 is an enlarged front view of the roll type of gaging element showing engagement with a thread outline.

The gaging ridges may be of the cone type, which is the form illustrated in FIG. 5, in which the adjacent flanks of adjacent thread turns are engaged by the gaging edge. The gaging edge may be of the V type or form in which the gaging surfaces of the gaging ridge engage opposite flanks of one thread turn or ridge on the tap. A common gaging practice is to use the V form on one side and a cone form on the other side so that the thread contact of the gaging elements is directly or diametrically opposite each other for a segmental type or approximately opposite for the tri-roll type of gage as shown in FIGS. 1 and 2, since the rolls are axially spaced from each other, as is well known, in accordance with the helix of the thread.

The supporting or cooperating element or elements may have a suitable form to engage the major diameter (OD) of the tap in which case the test given would be mainly a test for a low cutting edge and the cooperating means serves primarily as a supporting means for the tap. The reason for this is that the major diameter is not always concentric with the pitch circle of the thread. If it is known that the major diameter and pitch circle of the tap are concentric such as from an earlier test, then the gage can accurately test for pitch diameter using a cooperating gaging element which engages the major diameter of the tap. This uncertainty is removed by the supporting means engaging the thread. The same would be essentially true if the gaging ridge on the fixed and cooperating gaging elements have a full or substantially full thread form. Although with this form of gaging elements some indication of the diameter of the thread of the tap would be given, it would not be a conclusive test because there may be another thread fault which may cause a faulty diameter reading such as a narrow V thread profile. For a significant and accurate test of the diameter of the tap thread, the gaging ridges for the fixed and cooperating gaging elements are of the pitch diameter form so that a test for pitch diameter may be made as a part of the test for a low cutting edge.

It is immaterial which arm carries the fixed gaging element and which arm carries the cooperating supporting or gaging element. It is thought that it is more convenient in use to mount the fixed gaging element on the fixed arm.

In accordance with known gaging practice when using a pivotal arm and the gage is of the tri-roll type, FIG. 1, the indicator contactor C engages the movable arm at .866 of the distance between the center of the pivot for the movable arm and the gaging center B which then will give a direct reading of the pitch diameter with a standard dial scale. If the gage is of the type which engages across a diameter as in the gages of FIGS. 3 and 4, then the indicator contactor engages the movable arm in alignment with the gaging or tap center or the center of the gaging elements.

The fixed gaging element is reversed for a tap for a left hand thread for both the roll and segmental type. For a left hand thread tap, the supporting or gaging ridges of the segments would have a left hand helix by reversing this element. The supporting or gaging rolls 24 and 25 of the gage of FIG. 1 would be exchanged or mounted on the other stud to locate them properly for the left hand thread.

It is desirable that the gaging ridges engage solely the flanks of one thread ridge or opposite flanks of one thread groove. A satisfactory test would be secured in most cases if the gaging elements engaged the flanks of two thread ridges or grooves, however, other thread flanks could affect the test if the gaging elements engaged a greater number of tap thread ridges or grooves.

In setting the gage, the fixed gaging elements 17 and 34 should have their respective drop off shoulders 21 and 38 accurately on a radial line through the center of the tap. A deviation of no more than 5 thousandths of an inch on either side of such radial line is allowable but a more accurate setting is desirable.

This invention is presented to fill a need for improvements in a tap gage for low cutting edge. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A gage for a thread tap having longitudinally extending flutes forming a cutting edge or face comprising a frame having a fixed arm and mounting means, a movable arm mounted on the mounting means for movement towards and away from the fixed arm, gaging means including a single gaging element mounted in fixed position on one arm having a gaging edge having a pair of contacting edges spaced axially from each other at a shoulder extending radially from the gaging center and extending axially for contact of said edge with a thread of the tap, said gaging edges being solely on said shoulder, and cooperating means including at least one cooperating supporting element mounted on the other arm, the gaging edge of the fixed gaging element having a form for engagement of the opposite flanks of a thread portion on the tap, and the cooperating supporting means having a surface to engage the tap oppositely from the fixed gaging element and allow turning of the tap with respect thereto, and an indicator mounting means on one arm to receive an indicator having a contactor and located so that the contactor is responsive to the position of the movable arm or element carried thereby.

2. A gage as in claim 1 in which the fixed gaging element has a gaging ridge, and a recess extending inwardly forming the radially extending shoulder and the gaging edge.

3. A gage as in claim 2 in which the fixed gaging element is a gaging roll having a plurality of recesses around the periphery thereof each with a radial shoulder and gaging edge to provide at least one additional gaging edge.

4. A gage as in claim 1 in which the gaging surface on the fixed gaging element engages the tap thread at or adjacent the pitch diameter, and the cooperating supporting means being cooperating gaging means having a thread gaging ridge of a form to engage the flanks of the thread of the tap at or adjacent to the pitch diameter.

5. A gage as in claim 1 in which the cooperating means includes a pair of rolls circumferentially spaced with respect to the gaging center from the fixed gaging roll so that they are spaced according to the flutes in the tap and spaced about 10 degrees from the cutting edge of the tap.

6. A gage as in claim 1 in which the fixed gaging element is a segment having at least one concave gaging means.

7. A gage as in claim 1 in which the cooperating means is a segment having a concave helical thread engaging ridge for engaging the thread of the tap.

(References on following page)

References Cited

UNITED STATES PATENTS

| | | |
|---|---|---|
| 2,432,160 | 12/1947 | Johnson. |
| 2,745,188 | 5/1956 | Wills et al. |
| 3,222,793 | 12/1965 | Johnson. |
| 3,231,982 | 2/1966 | Ribich _____ 33—201 |

FOREIGN PATENTS 221,341   8/1942   Switzerland.

WILLIAM D. MARTIN, Jr., Primary Examiner

U.S. Cl. X.R.

33—199